(12) United States Patent
Iki et al.

(10) Patent No.: US 8,115,361 B2
(45) Date of Patent: Feb. 14, 2012

(54) COIL ASSEMBLY FOR ELECTRICAL ROTATING MACHINE, STATOR FOR ELECTRICAL ROTATING MACHINE, AND ELECTRICAL ROTATING MACHINE

(75) Inventors: Tomotaka Iki, Saitama (JP); Hisashi Murakami, Saitama (JP); Masaru Ozawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 373 days.

(21) Appl. No.: 12/320,653

(22) Filed: Jan. 30, 2009

(65) Prior Publication Data
US 2009/0195106 A1 Aug. 6, 2009

(30) Foreign Application Priority Data
Jan. 31, 2008 (JP) ................................. 2008-020057

(51) Int. Cl.
*H02K 3/04* (2006.01)
(52) U.S. Cl. ............... 310/208; 310/201; 310/254.1; 310/266; 310/268
(58) Field of Classification Search .................. 310/201, 310/208, 254.1, 266, 268; *H02K 3/04*
See application file for complete search history.

(56) References Cited

U.S. PATENT DOCUMENTS

| | | | | |
|---|---|---|---|---|
| 3,101,425 A | * | 8/1963 | Moressee et al. | 310/268 |
| 3,189,773 A | * | 6/1965 | Jacques | 310/268 |
| 3,231,774 A | * | 1/1966 | Jacques | 310/268 |
| 3,383,535 A | * | 5/1968 | Lohr | 310/268 |
| 3,479,967 A | * | 11/1969 | Crompton | 105/53 |
| 3,480,815 A | * | 11/1969 | Knapp | 310/268 |
| 3,500,095 A | * | 3/1970 | Keogh | 310/268 |
| 3,549,928 A | * | 12/1970 | Knapp | 310/268 |
| 3,648,360 A | * | 3/1972 | Tucker | 29/597 |

(Continued)

FOREIGN PATENT DOCUMENTS
CH 375 074 A 2/1964
(Continued)

OTHER PUBLICATIONS

European Search Report, 09001314.8-2207, dated May 14, 2009.

*Primary Examiner* — John K Kim
(74) *Attorney, Agent, or Firm* — Squire Sanders (US) LLP

(57) ABSTRACT

The torque characteristic is improved using a magnetic flux efficiently, and an eddy-current loss generated in a coil is reduced. Moreover, a loss is suppressed even if a metal member having a high thermal conductivity is closely disposed or closely contacted to a coil surface exposed by a variable magnetic field to improve the heat transfer property, thereby improving the cooling capability. A coil assembly for a rotational electric apparatus has first and second coil plates having wiring patterns formed in such a way that conductive coil segments adjoin with each other via slits, magnetic-flux-transfer-member slots formed in the slits and having a wider width than such slits, a coil constituted by the stacked coil plates so that the magnetic-flux-transfer-member slots overlap with each other, and a magnetic flux transfer member inserted into the magnetic-flux-transfer-member slots of the coil.

9 Claims, 12 Drawing Sheets

U.S. PATENT DOCUMENTS

| | | | |
|---|---|---|---|
| 4,484,097 A * | 11/1984 | Kanayama et al. | 310/268 |
| 4,823,039 A * | 4/1989 | Lynch | 310/268 |
| 5,097,167 A * | 3/1992 | Kanayama et al. | 310/201 |
| 5,177,392 A * | 1/1993 | Scott | 310/268 |
| 5,767,600 A | 6/1998 | Whiteley | |
| 6,411,002 B1 | 6/2002 | Smith et al. | |
| 2006/0238058 A1* | 10/2006 | Koide et al. | 310/156.55 |
| 2007/0080592 A1* | 4/2007 | Ohta et al. | 310/71 |
| 2009/0195106 A1* | 8/2009 | Iki et al. | 310/208 |

FOREIGN PATENT DOCUMENTS

| | | |
|---|---|---|
| GB | 966588 A * | 8/1964 |
| GB | 2 184 613 A | 6/1987 |
| JP | 2001-25211 | 1/2001 |
| WO | WO 01/47089 A2 | 6/2001 |
| WO | WO 2008/026771 | 3/2008 |

* cited by examiner

FIG.5A
FIG.5B
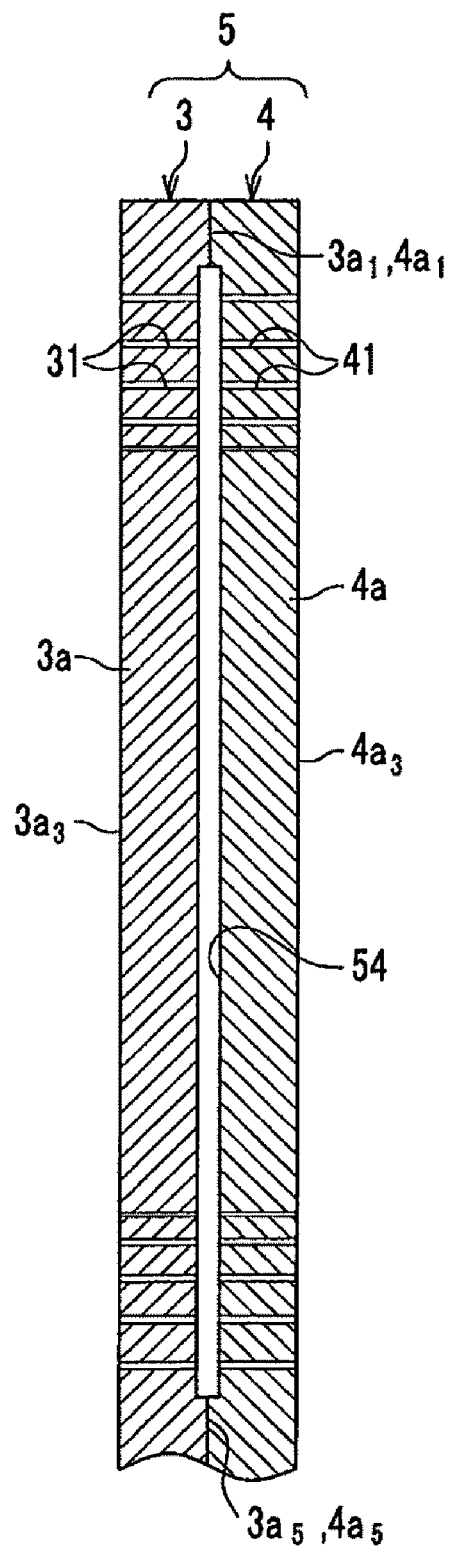
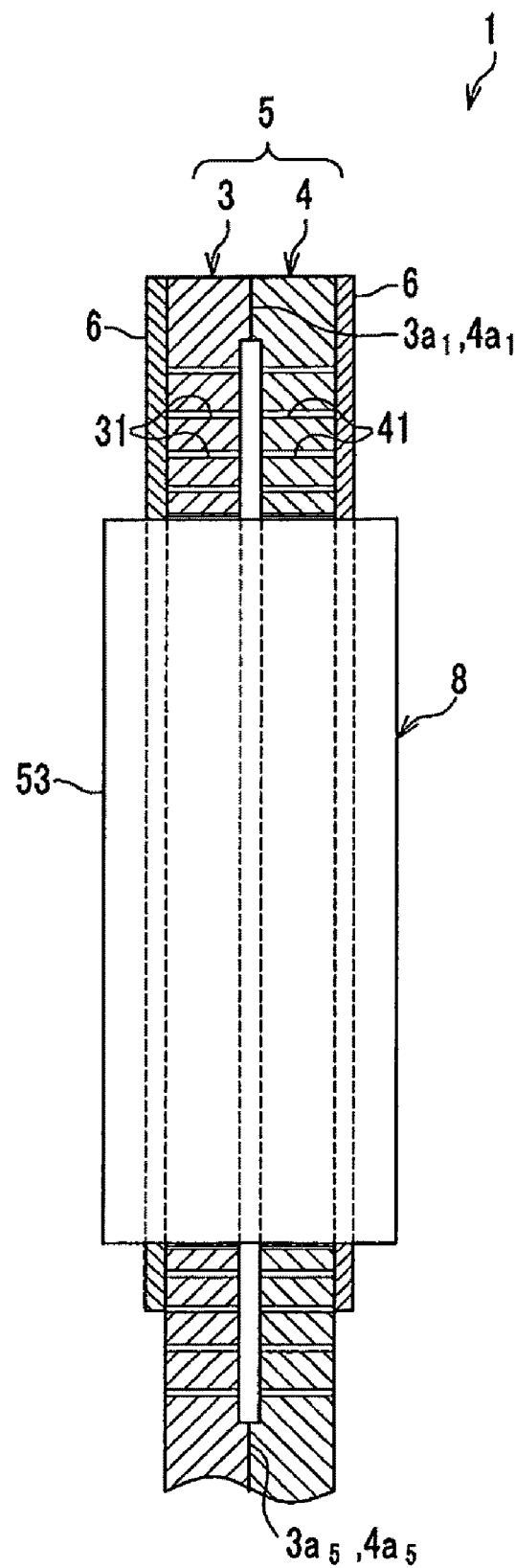

MAGNETIC FLUX FLOW →

MAGNETIC FLUX FLOW ⇒

COIL ASSEMBLY FOR ELECTRICAL ROTATING MACHINE, STATOR FOR ELECTRICAL ROTATING MACHINE, AND ELECTRICAL ROTATING MACHINE

CROSS REFERENCE TO RELATED APPLICATIONS

This application claims the foreign priority benefit under Title 35, United States Code, §119(a)-(d) of Japanese Patent Application No. 2008-020057, filed on Jan. 31, 2008 in the Japan Patent Office, the disclosure of which is herein incorporated by reference in its entirety.

BACKGROUND OF THE INVENTION

1. Field of the Invention

The present invention relates to a coil assembly for an electrical rotating machine, a stator for an electrical rotating machine, and an electrical rotating machine, and more particularly, a coil assembly and a stator for an axial type electrical rotating machine, and the axial type electrical rotating machine.

2. Description of the Related Art

In general, because coreless type electrical rotating machines (electric motors and electric generators) have no iron-based core member, in which magnetic saturation is caused by a coil current, in a coil member, the linearity of torque can be maintained relative to a large current, and it is possible to obtain a high instant maximum torque which is about five to ten times as much as a continuous rating torque.

Accordingly, the coreless type electrical rotating machines are used for adjustable-speed drives for a servo application or the like.

In order to achieve a high torque in the coreless type electrical rotating machines, it is necessary to increase a conductor thickness to allow a large current to flow therethrough, but the conductor thickness at a coil member directly affects a magnetic air gap, so that the magnetic air gap increases. Therefore, the magnetic resistance becomes large and the flux quantity decreases, resulting in reduction of an output power.

In the coreless type electrical rotating machines, due to the characteristic thereof, the magnetic flux directly interlinks a conductor, so that an eddy current is generated in the conductor. The eddy current causes a conductor-eddy-current loss. Conversely, if the width dimension of a coil facing a magnet is narrowed to suppress the conductor-eddy-current loss, the coil must have thinner lines, so that there is a contradictory problem that it becomes difficult to allow a large current to flow through. Further, thinning of the coil pattern (wiring pattern) results in decrement of the strength, and it becomes difficult to stably maintain the coil shape.

Therefore, according to the conventional coreless type electrical rotating machines, even though they have a high instant torque, their application is limited to small motors having a small output from several ten to several hundred Watts because of the foregoing reasons.

In particular, a stator coil for a small flat motor is formed with a pattern coil for thinning and miniaturization (see, for example, U.S. Pat. No. 6,411,002, FIG. 18), but if the pattern coil is used as a stator coil for a motor having a large output greater than or equal to, for example, several 10 k Watts, it is difficult to allow a large current to flow through because reduction of a conductor resistance is difficult, so that sufficient improvement of the output cannot be achieved.

Further, motors allowing a large current to flow for a large output application may have a cooling pipe closely contacted to the surface of a coil in order to efficiently cool down the coil (see, JP 2001-25211 A).

SUMMARY OF THE INVENTION

A first aspect of the present invention provides a coil assembly for a stator of an electrical rotating machine comprising: first and second coil plates each including coil segments, one coil segment adjoining another coil segment through a slit comprising a slot, the first and second coil plates being laminated so that the slots thereof overlap with each other, the first and second coil plates being mechanically and electrically connected so as to have a coil; and magnetic transfer members in the slots configured to transfer magnetic flux.

In this structure, by providing the magnetic flux transfer member, the magnetic flux is transferred to a rotor via the magnetic flux transfer member. Accordingly, it becomes possible to be shortened the magnetic air gap even if the conductor is thickened, and the effective flux quantity is increased, thereby improving the torque characteristic. Further, because the magnetic flux is transferred via the magnetic flux transfer member, the magnetic flux directly interlinking the conductor is reduced, thereby extremely reduces an eddy-current loss caused at the conductor. Furthermore, by inserting the magnetic flux transfer member into the magnetic-flux-transfer-member slot formed in the conductor and by integrating those together by resin molding or the like, the rigidity of the coil can be improved.

A second aspect of the present invention provides a coil assembly based on the first aspect, wherein at least one of the first and second coil plates comprises a plurality of coil plate base members which are laminated, each of the coil plate base members are formed by etching.

In this structure, by forming the wiring pattern by etching, it is possible to form a highly-precise coil pattern, and it is possible to form a space where the magnetic flux transfer member is inserted highly precisely while maintaining the most appropriate conductor width, thereby improving the easiness of manufacturing.

A third aspect of the present invention provides a coil assembly based on the first aspect, wherein the first and second coil plates are mechanically and electrically connected through a diffusion bonding portion.

In this structure, by stacking and integrating (laminating and connecting) the coil plate base members together by diffusion bonding, the conductor resistance can be reduced and the wiring patterns formed at respective coil plate base members can maintain the corresponding phase relationship, and insertion of the magnetic flux transfer member becomes easy, thereby improving the easiness of manufacturing.

A fourth aspect of the present invention provides a coil assembly based on the first aspect, wherein the magnetic transfer members in the slots protrude from the coil segments.

In this structure, by causing the magnetic flux transfer member to protrude from the surface of the coil and by shortening the distance from the magnetic flux transfer member to the magnet 121 of the rotor than the distance from the coil surface to the magnet 121 of the rotor, the magnetic flux is transferred to the magnet 121 of the rotor via the magnetic flux transfer member, not via the coil. Accordingly, the magnetic flux passing through the coil can be reduced, thereby suppressing any generation of an eddy current.

A fifth aspect of the present invention provides a stator comprising the coil assembly based on the first aspect, further comprising a heat transfer member covering at least one of the first and second coil plates.

In this structure, by providing the heat transfer member closely contacting or in the vicinity of the surface of the coil, heat generated by the coil can be efficiently transferred, thereby improving the cooling capacity.

Moreover, by providing the magnetic flux transfer member and the heat transfer member, the magnetic flux is transferred via the magnetic flux transfer member and heat generated by the coil is transferred via the heat transfer member, so that it becomes possible to select materials appropriate for the characteristics required for respective members.

A sixth aspect of the present invention provides a stator based on the fifth aspect, wherein the heat transfer member includes induced-current-cutoff slits, and the magnetic transfer members protrude from the heat transfer member through the induced-current-cutoff slits.

In this structure, by causing the magnetic flux transfer member to protrude from the surface of the heat transfer member and by shortening the distance from the magnetic flux transfer member to the magnet 121 of the rotor than the distance from the heat transfer member to the magnet 121 of the rotor, the magnetic flux is transferred to the magnet 121 of the rotor via the magnetic flux transfer member, not via the heat transfer member. Accordingly, the magnetic flux passing through the heat transfer member can be reduced, thereby suppressing any generation of an eddy current.

A seventh aspect of the present invention provides a stator based on the sixth aspect, wherein the induced-current-cutoff slits are disposed at such positions as to cut off induced currents generated in the heat transfer member.

In this structure, by providing the induced-current cutoff slit which cuts off an induced current flowing through the heat transfer member, a loss accompanied with generation of an induced current can be reduced.

An eighth aspect of the present invention provides a stator based on the fifth aspect, wherein the heat transfer member includes a lower magnetic permeability than the magnetic flux transfer member.

In this structure, the magnetic flux is transferred via the magnetic flux transfer member having a high magnetic permeability, not via the heat transfer member. Accordingly, the magnetic flux passing through the heat transfer member can be reduced, thereby suppressing generation of an eddy current.

A ninth aspect of the present invention provides a stator based on the fifth aspect, further comprising a coolant passage that allows a coolant to flow therethrough and is thermally coupled to the heat transfer member to transfer heat generated by the coil to the coolant.

In this structure, by providing the coolant passage adjacent to the peripheral edge portion of the coil segment, it is possible to dissipate heat generated at the coil efficiently and rapidly without increasing the thickness of the stator.

A tenth aspect of the present invention provides a stator based on the fifth aspect, wherein the heat transfer member closely contacts the surface of the coil via an insulator; and the insulator comprises an insulation sheet and a heat transfer sheet which more transfer heat in one direction than other directions, and is so disposed as to transfer heat generated by the coil in the direction of the coolant passage.

In this structure, by closely contacting the heat transfer member to the coil via the insulator and by electrically insulating the heat transfer member from the coil, the current can flow through inside the coil without short-circuit, and heat generated by the coil is transmitted to the coolant passage via the heat transfer member, so that it becomes possible to select materials appropriate for the characteristics required for the respective members.

Moreover, because the insulator is disposed in such a manner as to transfer heat transferred by the heat transfer member in the direction of the coolant passage, the heat transfer efficiency can be improved, thereby dissipating heat generated by the coil more efficiently and rapidly.

An eleventh aspect of the present invention provides a stator based on the fifth aspect, wherein the heat transfer member comprises an electrical conductive material.

In this structure, by providing the magnetic flux transfer member and the heat transfer member, formed of a conductive material (e.g., copper, aluminum, and an ally thereof) having a good thermal conductivity, the magnetic flux is transferred via the magnetic flux transfer member while maintaining a good cooling efficiency, and heat generated by the coil is efficiently transferred via the heat transfer member.

Twelfth and thirteenth aspects of the present invention provides an electrical rotating machine comprising the coil assembly based on the first aspect or the stator based on the fifth aspect, further comprising: two rotors each including a plurality of pairs of magnets, each pair of magnets facing each other with opposite magnetic polarity through the coil.

In this structure, a loop is formed in such a way that the magnetic flux passes all the way through the magnetic flux transfer member but hardly passes through the coil or the heat transfer member, so that it is possible to extremely reduce an eddy-current loss generated at the coil or the heat transfer member.

The coil assembly for a rotational electric apparatus, the stator for a rotational electric apparatus, and the rotational electric apparatus of the present invention can improve the torque characteristic and reduces an eddy-current loss firstly, and improve the cooling capacity of a coil while suppressing any loss secondly.

A fourteenth aspect of the present invention provides a coil assembly based on the first aspect, wherein the slot has a width greater than a width of slit.

In this structure, by widening the magnetic-flux-transfer-member slot only, not by widening the width of the slit across entire length, it is possible to suppress reduction of the space factor. Further, by causing the shape of the magnetic-flux-transfer-member slot to fit the shape of the magnetic flux transfer member, it is possible to stably hold the magnetic flux transfer member.

BRIEF DESCRIPTION OF THE DRAWINGS

The object and features of the present invention will become more readily apparent from the following detailed description taken in conjunction with the accompanying drawings in which:

FIG. 3D is a partial plan view of a second coil plate shown in

FIG. 3A;

FIGS. 4A and 4B are partial side views for explaining how to stack a first coil plate and a second coil plate together, wherein FIG. 4A shows a state before stacked and FIG. 4B shows a stacked state;

FIGS. 5A and 5B are cross-sectional views of the coil, wherein FIG. 5A shows a state where the magnetic flux transfer member is not inserted and FIG. 5B shows the coil having the magnetic flux transfer member and a heat transfer member;

The same or corresponding elements or parts are designated with like references throughout the drawings.

DETAILED DESCRIPTION OF THE INVENTION

Prior to describing an embodiment of the present invention, the above-mentioned related art will be further explained.

As mentioned earlier, if the annular disks magnetized to provide multiple sector-shaped poles disclosed in U.S. Pat. No. 6,411,002, is used as a stator coil for a motor having a large output greater than or equal to, for example, several 10 k Watt, it is difficult to allow a large current to flow through because reduction of a conductor resistance is difficult, so that sufficient improvement of the output cannot be achieved.

Under such a circumstance, the inventors of the present invention filed WO/2008/026771, on Aug. 30, 2007. An electrical rotating machine disclosed by WO/2008/026771 can allow a large current to flow through to achieve a high output and a high torque by stacking pattern coils and a diffused bond is formed between them to increase a conductor cross-sectional area to reduce a conductor resistance, and further to increase the space factor.

However, it is desired to further reduce the copper loss in order to further improve the torque characteristic. If the conductor thickness is increased in order to satisfy this demand, the magnetic air gap with the opposing face of a rotor is increased, resulting in reduction of the flux quantity, so that it is difficult to increase the output. Further, increment of the conductor thickness results in increment of a weight and increment of a space in an axial direction.

According to JP 2001-25211A, from the standpoint of cooling efficiency in order to allow a large current to flow through, when the cooling tube is closely contacted to the coil surface, the material of the cooling tube must be a non-metal so that no eddy current caused by an alternating magnetic flux is generated. Accordingly, it is difficult to select a material having a high thermal conductivity for the cooling tube, and it is difficult to improve the cooling capacity.

The present invention has been made in view of the foregoing circumstances, and the present invention improves a torque characteristic by efficiently utilizing a magnetic flux, and reduces an eddy current loss caused in a coil.

Moreover, the present invention improves a heat transfer performance by closely providing or closely contacting a metal member and the like having a high thermal conductivity to the surface of a coil, thereby improving a cooling capacity.

Embodiment

With reference to the drawings will be described an embodiment of the present invention.

Figure 1:
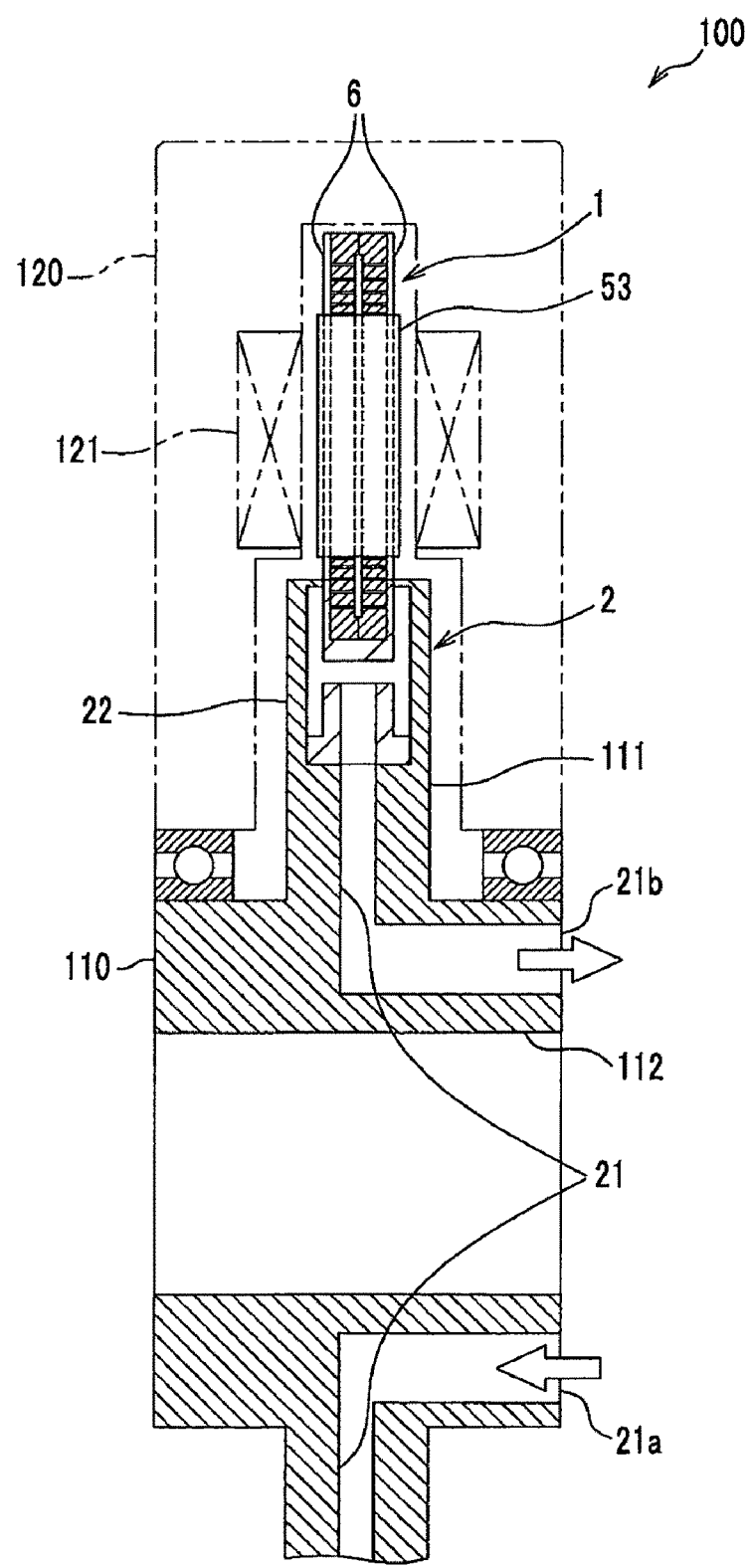
FIG. 1 is a partial cross-sectional view of a stator according to an embodiment of the present invention which is used in a motor.
Figure 2:
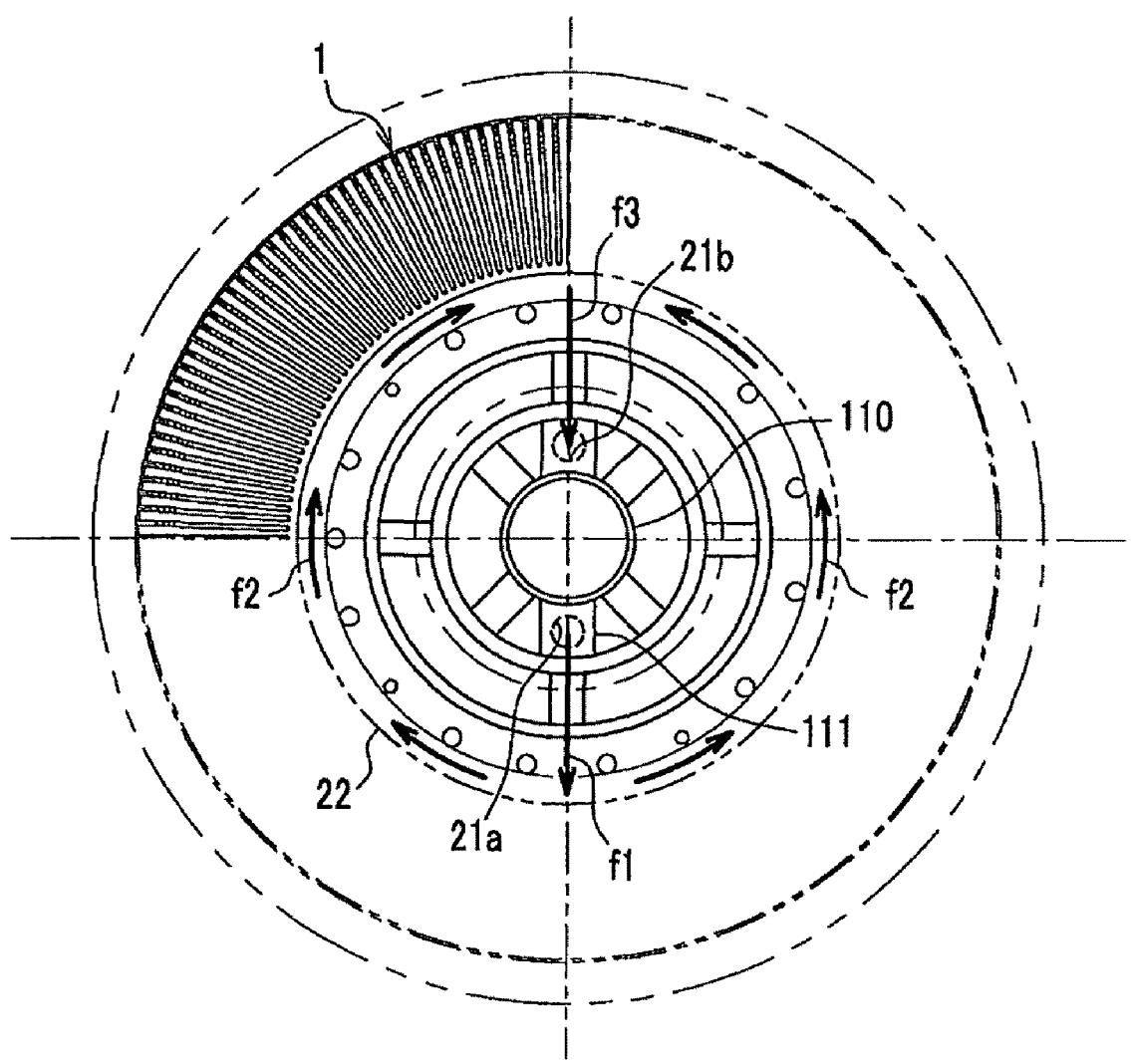
FIG. 2 is a side view of the stator shown in FIG. 1.
Figure 3A:
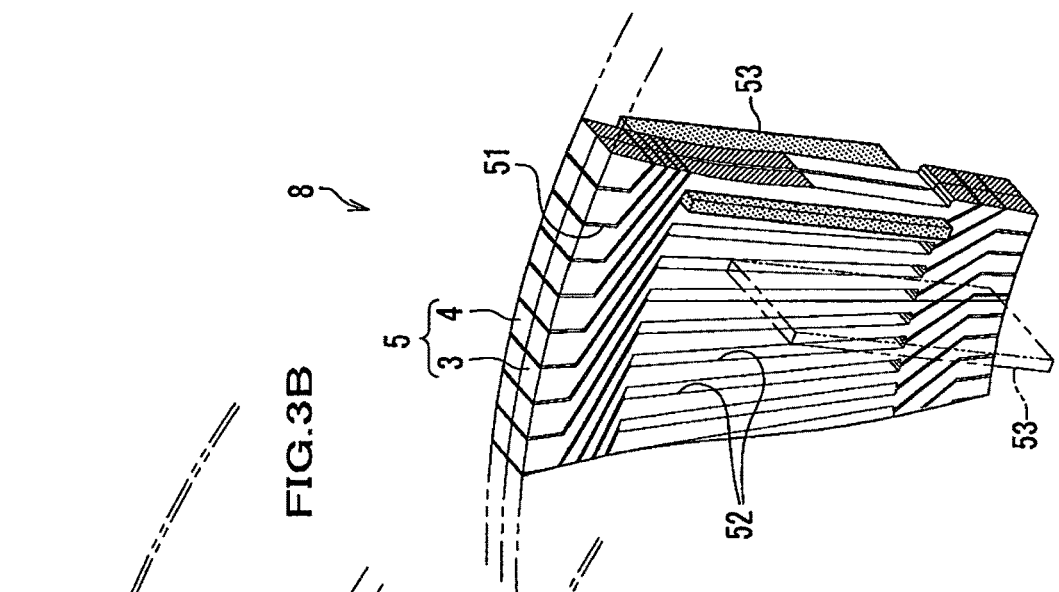
FIG. 3A is an exploded perspective view of the stator to show how a magnetic flux transfer member is inserted.
Figure 3B:
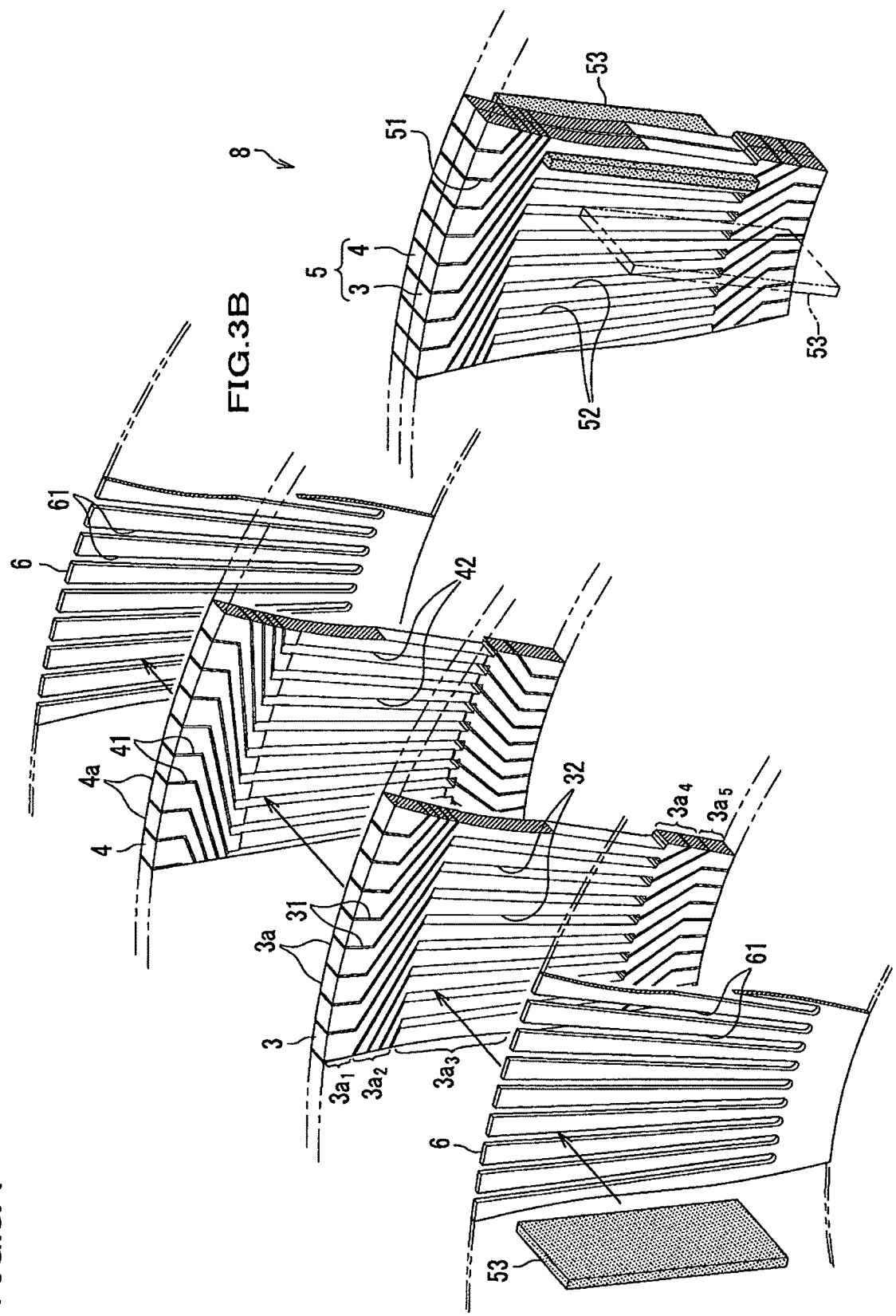
FIG. 3B is a partial perspective view of a coil assembly.
Figure 4A:
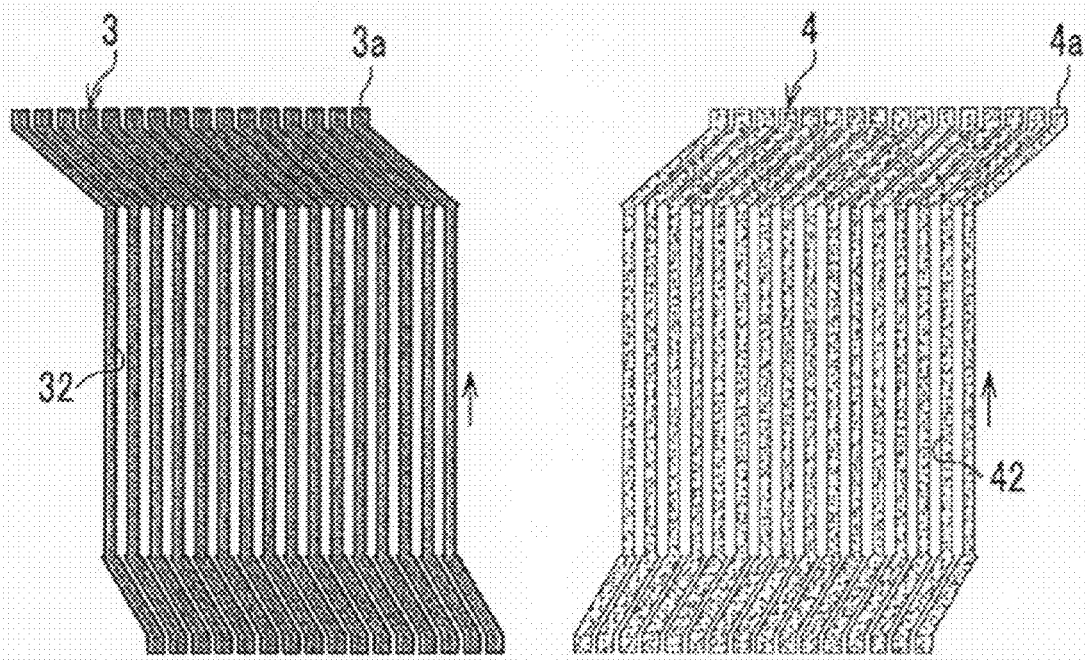
Figure 4B:
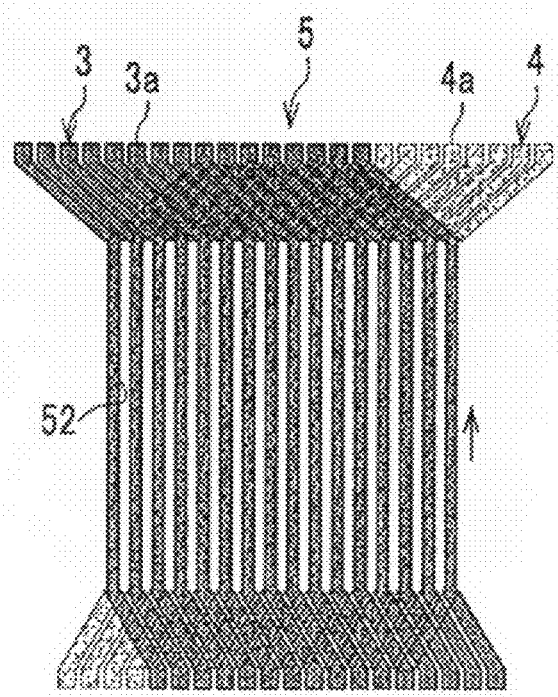
Figure 6A:
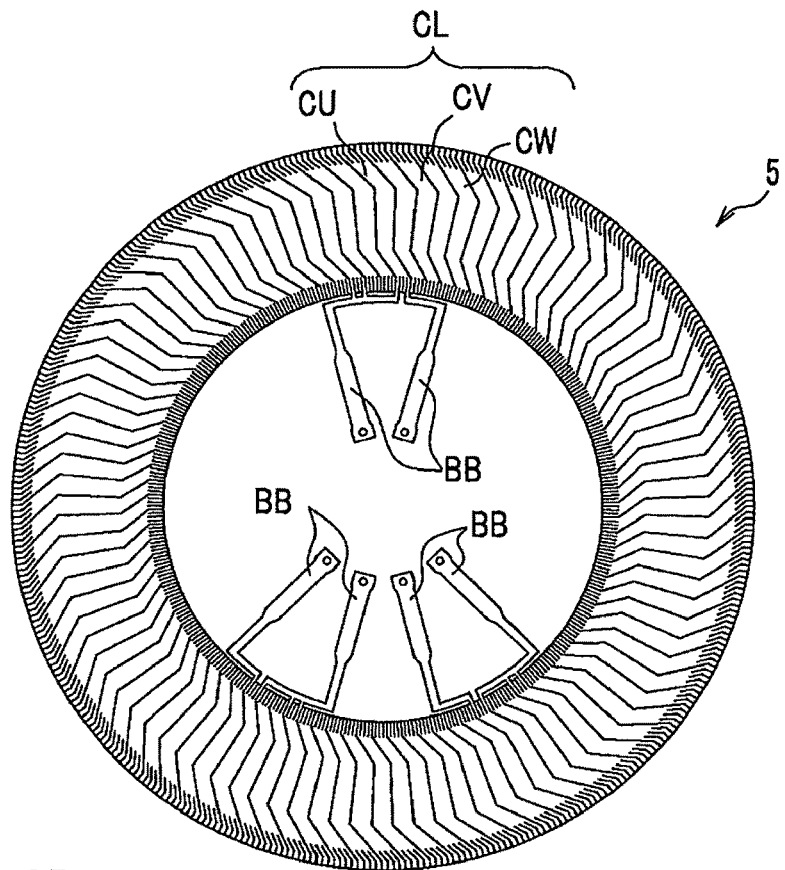
FIG. 6A is a side view of the coil.
Figure 6B:
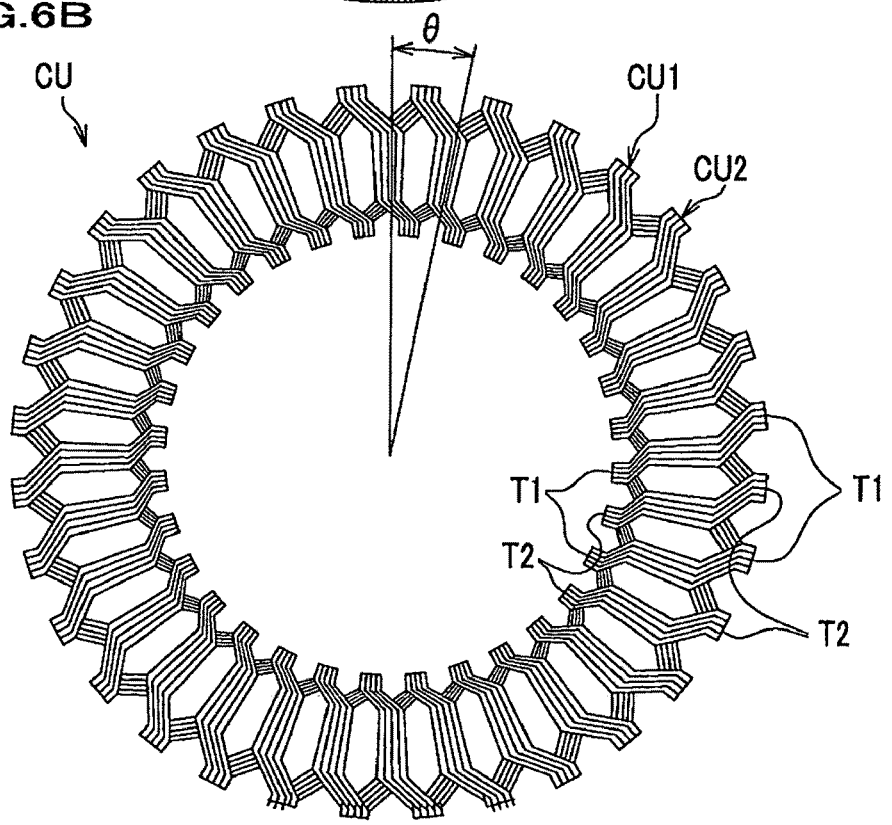
FIG. 6B is a side view of a U-phase coil loop virtually removed out.

FIG. 1 shows a structure that a stator according to the embodiment of the present invention is used in a motor. FIG. 2 shows a side view of the stator shown in FIG. 1. FIGS. 3A and 3B show how a magnetic flux transfer member is inserted. FIG. 4A shows a state before first and second coil plates are stacked, and FIG. 4B shows a stacked state. FIG. 5A shows a state where the magnetic flux transfer member is not inserted, and FIG. 5B shows the coil having the magnetic flux transfer member and a heat transfer member. FIG. 6A shows the coil, and FIG. 6B shows a U-phase coil loop virtually removed out.

Figure 7A:
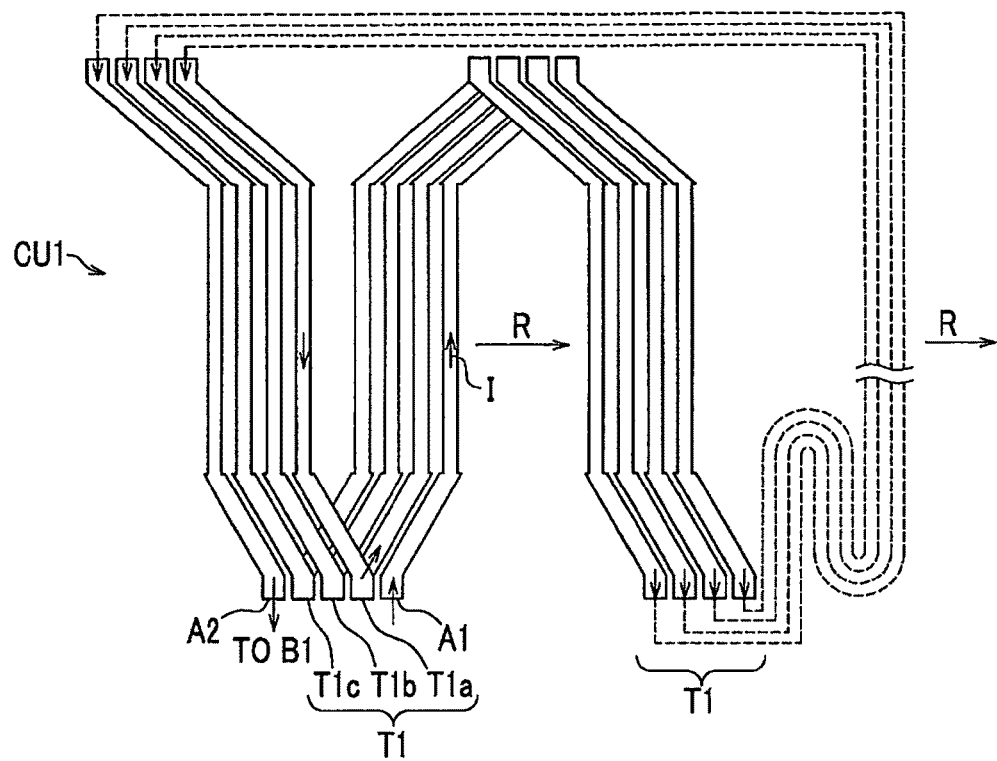
FIG. 7A is an illustration of a first coil plate loop in which a circumferential direction of the coil is shown in a horizontal direction of the drawing to explain the flow of a current in the U-phase coil loop.
Figure 7B:
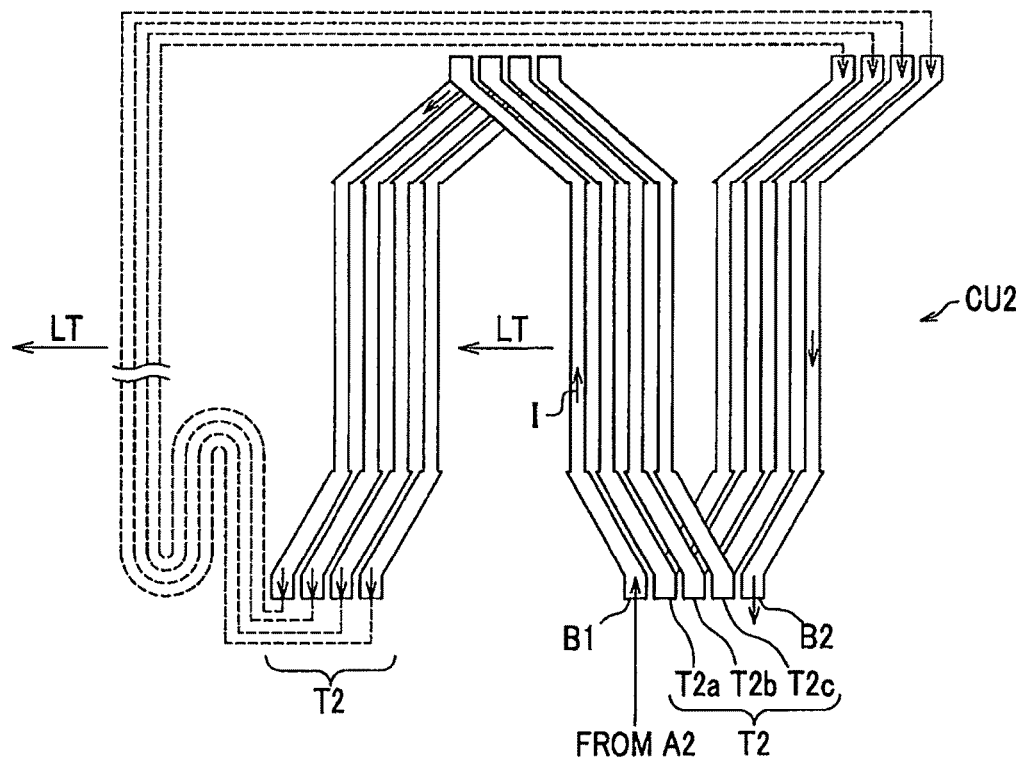
FIG. 7B is an illustration of a second coil plate loop in which a circumferential direction of the coil is shown in a horizontal direction of the drawing to explain the flow of a current in the U-phase coil loop.

FIG. 7A shows a current flow in a first coil plate loop, and FIG. 7B shows a current flow in a second coil plate loop.

As shown in FIG. 1, a stator 1 (stator for electrical rotating machine) including a coil assembly for an electrical rotating machine according to the embodiment of the present invention is applicable to the stator of a motor 100 which is an electrical rotating machine.

The motor 100 is an axial disc type motor having a shortened length in an axial direction, and for example, can be appropriately used as an in-wheel motor or the like which is housed in the wheel of a vehicle.

The motor 100 has a shaft 110 which is supported by, for example, a body of vehicle, the stator 1 fixed to a rim 111 of the shaft 110 and formed in a shape like a circular disc (see FIG. 2), two rotors 120 rotatably supported by the shaft 110 through bearings so as to cover the stator 1, magnets 121 disposed in the rotor 120, and a cooling device 2 for cooling the stator 1.

The shaft 110 has a through hole 112 fixed to a spindle (not shown), the rim 111 extending in a radial direction from an outer circumferential surface of the shaft 110, a coolant passage 21 which is a part of the cooling device 2, and an annular water jacket 22 through which a coolant supplied from the coolant passage 21 flows. As shown in FIG. 1, the stator 1 is fixed to the rim 111 in such a manner as to be sandwiched between members of the annular water jacket 22 provided on both sides and facing with each other.

As shown in FIG. 3A, the stator 1 includes a first coil plate 3 and a second coil plate 4 both formed of conductive materials and respectively having a wiring pattern, and a coil 5 (see FIG. 3B) formed by stacking the first coil plate 3 and the second coil plate 4 together by diffusion bonding. The stator 1 further includes magnetic-flux-transfer-member slots 52 each of which is wider than a slit 51 formed in the coil 5 in a circumferential direction of the stator 1, magnetic flux transfer members 53 inserted into the respective magnetic-flux-transfer-member slots 52, and a comb heat transfer member 6 closely contacting the outer surfaces of the first coil plate 3 and the second coil plate 4.

As shown in FIG. 3B, a coil assembly 8 which is for an electrical rotating machine comprises the coil 5 and the magnetic flux transfer members 53.

The first coil plate 3 is formed in a circular disc (see FIG. 2), and as shown in FIG. 3A, coil segments (conductors) 3a each of which is a conductive member and is formed in a zigzag line shape are annularly disposed in such a way that one coil segment adjoins another coil segment via individual slits 31. As shown in FIG. 3A, the coil segment 3a of the first coil plate 3 is patterned and formed in a zigzag line shape toward the upside of the figure from the outer peripheral edge to the inner peripheral edge, and from the upper left to the lower right.

More specifically, the coil segment 3a comprises a conductor pattern having a joined portion (diffusion bonding portion) 3a1 formed in a radial direction from the outer peripheral edge side, an inclined portion 3a2 formed in an inclined direction, a central straight line portion 3a3 formed in the radial direction, an inclined portion 3a4 formed in another inclined direction, and a joined portion 3a5 formed in the radial direction on the inner peripheral edge.

The magnetic-flux-transfer-member slot 32 is formed by widening a part of the slit 31 (the slot 53 has a width greater than the other part of the slit 31), and is disposed at a position in the vicinity of the central straight line portion $3a_3$ of the coil segment 3a. The magnetic-flux-transfer-member slot 53 is a through hole with a rectangular opening which fits the shape of the magnetic flux transfer member 53 so as to stably support the magnetic flux transfer member 53. Examples of the cross-sectional shape of the magnetic flux transfer member 53 are a rectangular shape, a sector-like shape, and other various shapes can be employed.

Like the first coil plate 3, the second coil plate 4 is formed in a shape like a circular disc (see FIG. 2), and as shown in FIG. 3, coil segments (conductors) 4a each of which is a conductive member and is formed in a shape like a zigzag line are annularly provided in such way that one coil segment adjoins another coil segment via individual slits 41.

However, the coil segments 4a of the second coil plate 4 are patterned and formed in a zigzag line shape toward the upside of the figure from the outer peripheral edge to the inner peripheral edge and from the upper right to the lower left so as to be symmetrical to the coil segments 3a of the first coil plate 3.

More specifically, like the first coil plate 3, the coil segment 4a comprise a conductor pattern having a joined portion $4a_1$ formed in a radial direction from the outer peripheral edge side, an inclined portion $4a_2$ formed in an inclined direction, a central straight line portion $4a_3$ formed in the radial direction, an inclined portion $4a_4$ formed in another inclined direction, and a joined portion $4a_5$ formed in the radial direction on the inner peripheral edge.

A magnetic-flux-transfer-member slot 42 is formed by widening a part of the slit 41, and is provided at a position in the vicinity of the central straight line portion $4a_3$.

As shown in FIG. 3A, the first coil plate 3 and the second coil plate 4 are stacked together in such a way that the respective magnetic-flux-transfer-member slots 32 and 42 overlap with each other (see FIG. 4B), and the magnetic flux transfer member 53 is so inserted as to pass all the way through from the magnetic-flux-transfer-member slot 32 of the first coil plate 3 to the magnetic-flux-transfer-member slot 42 of the second coil plate 4 (see FIG. 3B).

More specifically, as shown in FIG. 5A, a coil segment 3a of the first coil plate 3 and a coil segment 4a of the second coil plate 4 have the outer-peripheral side joined portions (diffusion bonding portions) $3a_1$ and $4a_1$ joined together, and the inner-peripheral side joined portions $3a_5$ and $4a_5$ (diffusion bonding portions) joined together, and a space 54 is provided between the central straight line portions $3a_3$ and $4a_3$.

Next, will be described a method of manufacturing the first coil plate 3 and the second coil plate 4.

Figure 3C:
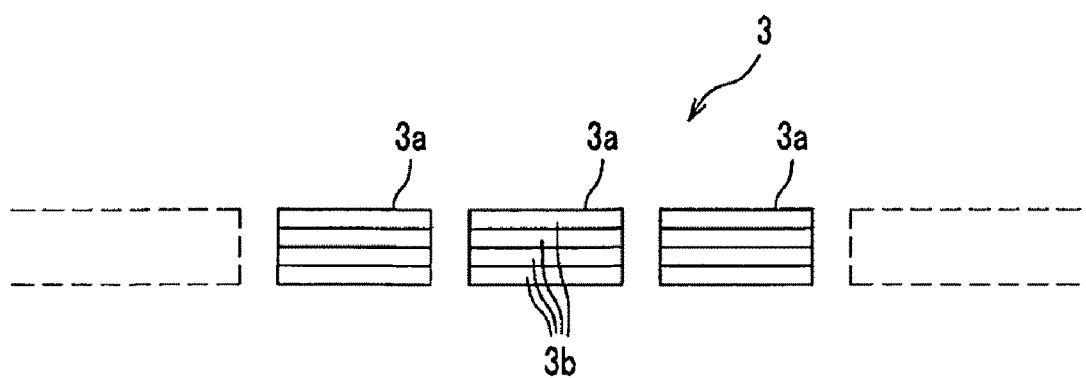
FIG. 3C is a partial plan view of a first coil plate shown in FIG. 3A.
Figure 3D:
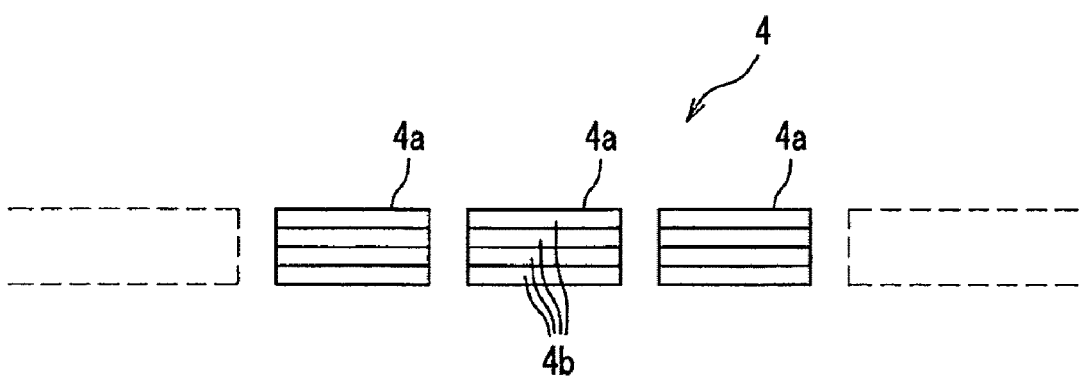

The wiring patterns of the first coil plate 3 and the second coil plate 4 are formed by etching. That is, the first coil plate 3 is formed by etching on a copper plate having a thickness of 0.1 mm to form a coil plate base member 3b having a wiring pattern, and by laminating thirty-seven of the base members 3b and integrating together by diffusion bonding so as to obtain a thickness of 3.7 mm as shown in FIG. 3C. The same is true for the second coil plate 4 including base members 4b as shown in FIG. 3D.

The coil 5 is manufactured by stacking (laminating) the individually integrated first coil plate 3 and second coil plate 4 by diffusion bonding.

With this method, by forming the wiring patterns by etching, a highly precise processing that a slit width is less than or equal to 0.5 mm becomes possible, so that the magnetic flux transfer member 53 can be stably held, and the easiness of the manufacturing can be improved. Moreover, by stacking (laminating) the coil plate base members 3b and 4b together by diffusion bonding, it is possible to integrate the base members 3b and 4b together with the wiring patterns formed on respective base members 3b and 4b maintaining the correspondence phase relations highly precisely. This facilitates insertion of the magnetic flux transfer member 53, and improves the easiness of the manufacturing.

Although the first coil plate 3 or the second coil plate 4 are formed by joining plural coil plate base members 3b, formed by etching, and integrating those together by diffusion bonding in the embodiment, the present invention is not limited to this case, and when the slit width is set to be relatively wide like greater than or equal to 0.5 mm, the first coil plate 3 and the second coil plate 4 may be manufactured by other appropriate processing, such as wire cutting, laser processing, and notching pressing, and by stacking and joining plural base members by brazing joining, thermal pressing, or diffusion bonding.

By joining the first coil plate 3 and the second coil plate 4 together through the foregoing manner, as shown in FIG. 6A, the coil 5 is so formed as to have coil loops CU, CV, and CW of three phases (three-phase coil loops CL): U-phase, V-phase, and W-phase. Each coil loops CU, CV, and CW has two bus bars BB which serve as feeding terminals.

Hereinafter, an explanation will be given of the U-phase coil loop CU (see FIG. 6B) that is obtained by virtually removing one-phase coil loop from the three coil loops CU, CV, and CW, and the explanations for the other phases will be omitted to avoid duplicate explanation.

As shown in FIG. 6B, the U-phase coil loop CU comprises two independent first coil plate loop CU1 and second coil plate loop CU2 formed in the same spiral shape and connected in series via the bus bars BB (see FIG. 6A).

The first coil plate loop CU1 and the second coil plate loop CU2 are arranged so as to loop back on each other in such a way that turning portions T1, T2 which are parts of respective coil loops are alternately disposed in the circumferential direction of the coil loops.

That is, the first coil plate loop CU1 spirally turns at turning portions T1, from a turning portion T1 on the inner peripheral edge side to a turning portion T1 on the outer peripheral edge side, and further to a turning portion T1 on the inner peripheral edge side, and goes round to form an annular coil loop. Likewise, the second coil plate loop CU2 spirally turns at turning portions T2, from a turning portion T2 on the inner peripheral edge side to a turning portion on the outer peripheral edge side, and further to a turning portion T2 on the inner peripheral edge side, and goes round to form an annular coil loop.

As shown in FIGS. 7A and 7B, the first coil plate loop CU1 and the second coil plate loop CU2 have a feeding terminal A1 and an output terminal A2 (see FIG. 7A), and a feeding terminal B1 and an output terminal B2 (see FIG. 7B), respectively, at the individual bus bars BB. The output terminal A2 of the first coil plate loop CU1 and the feeding terminal B1 of the second coil plate loop CU2 are connected together, so that the first coil plate loop CU1 and the second coil plate loop CU2 are connected in series, thereby constituting the U-phase coil loop CU.

Next, an explanation will be given of the flow of a current in the U-phase coil loop CU.

As shown in FIG. 7A, in the first coil plate loop CU1, as a current I is supplied from the feeding terminal A1 on the inner peripheral edge side, the current I flows spirally in a clockwise direction (direction of arrow R) from a turning portion T1 on the outer peripheral edge side to a turning portion T1 on the inner peripheral edge side, goes round the first coil plate loop CU1, reaches a turning portion T1a next to the feeding terminal A1, once again goes round the first coil plate loop CU1 in a clockwise direction to adjacent turning portions T1b, T1c, successively goes round the first coil plate loop CU1 four times at total, and is output from the output terminal A2.

The current I output from the output terminal A2 is supplied to the feeding terminal B1 of the second coil plate loop CU2. In the second coil plate loop CU2, as shown in FIG. 7B, the current I spirally flows in a counterclockwise direction (direction of arrow LT) from a turning portion T2 on the outer peripheral edge side to a turning portion T2 on the inner peripheral edge side, goes round the second coil plate loop CU2, reaches adjacent turning portions T2a, T2b, and T2c adjacent to the feeding terminal B1, successively goes round the second coil plate loop CU2 four time at total, and is output from the output terminal B2.

As explained above, the current I flows in the clockwise direction through the first coil plate loop CU1, and in the counterclockwise direction through the second coil plate loop CU2, so that the central straight line portions $3a_3$, $4a_3$ of the respective coil segments 3a, 4a connected together in such a way that the current I flows in the same direction (outer circumferential direction or inner circumferential direction). Accordingly, at the central straight line portions $3a_3$, $4a_3$, the directions of the magnetic fluxes by the current I become consistent, and the magnetic fields are generated so as to be mutually enhanced.

Figure 8A:
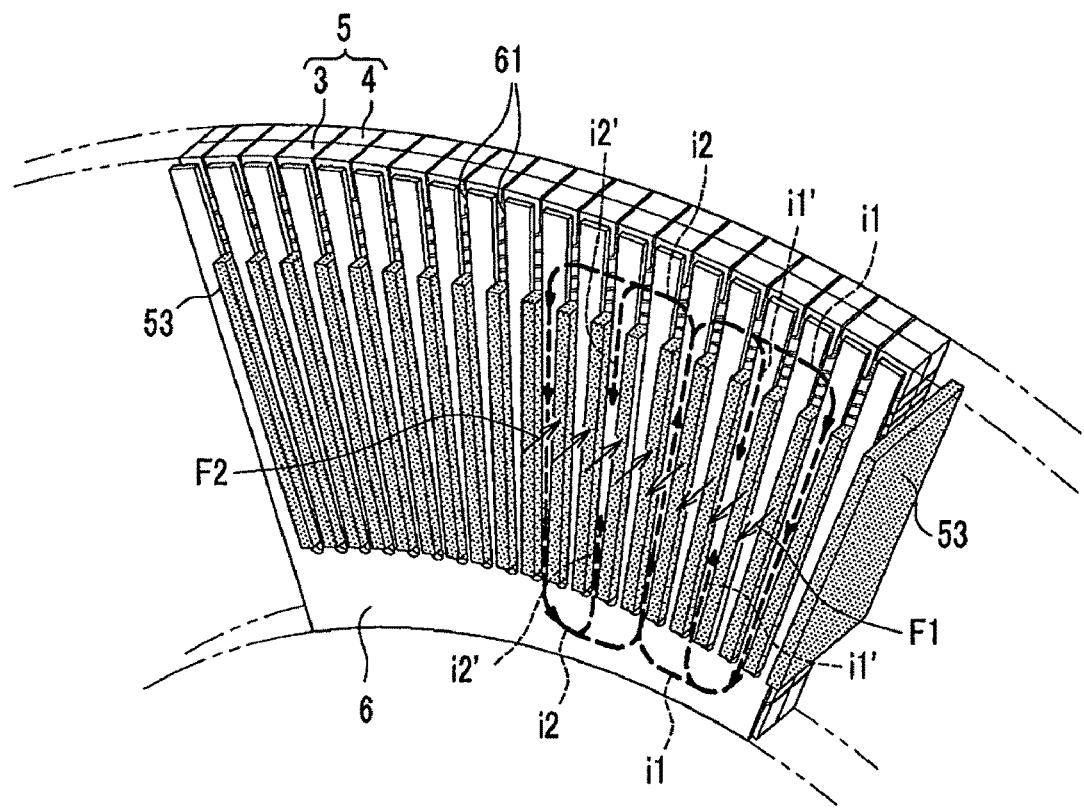
FIG. 8A is a partial perspective views of coil assembly for showing the heat transfer member having a comb shape which is also shown in FIG. 3A.
Figure 8B:
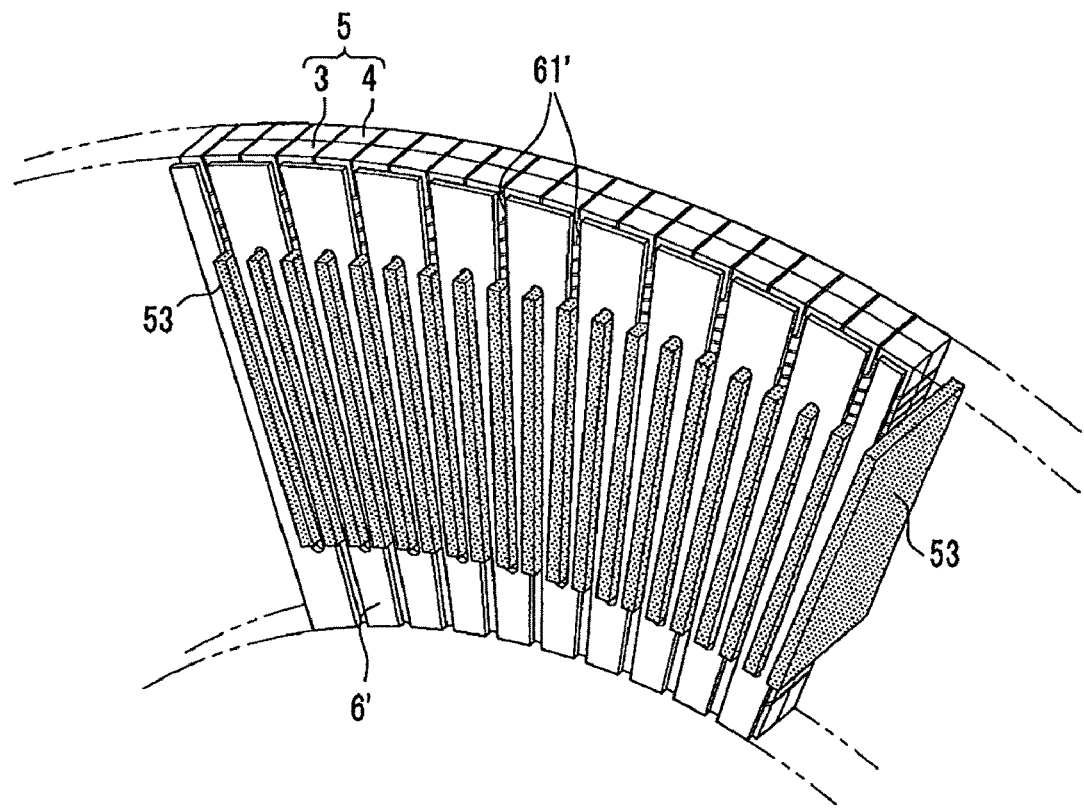
FIG. 8B is a partial perspective view of coil assembly for showing another example of the heat transfer member having a zigzag shape.

Next, an explanation will be given of the heat transfer member 6 with reference to FIGS. 8A and 8B. FIGS. 8A and 8B are perspective views for explaining the structure of the heat transfer member 6, wherein FIG. 8A shows an example of a heat transfer member formed in a comb shape corresponding to FIG. 3A, and FIG. 8B shows another example of a heat transfer member formed in a wavy shape.

As shown in FIG. 8A, the heat transfer member 6 is formed in a comb shape having slits 61 serving as induced current cutoff slits having successive inner peripheral edges and extending from the outer peripheral edge toward the inner peripheral edge. The heat transfer member 6 closely contacts the surface of the coil 5 by bonding or the like.

Each slit 61 is disposed so as to house the magnetic flux transfer member 53 inserted into the magnetic-flux-transfer-member slots 52 (32, 42). The magnetic flux transfer member 53 has a total length L which is longer than the total thickness of the coil 5 and the two heat transfer members 6 by a predetermined protruding length ($\delta 2 - \delta 1$) (see FIG. 9), is inserted in such a manner as to pass all the way through the coil 5 and protrude from the surface of the heat transfer member 6, and faces at an end thereof the magnet 121 disposed in the rotor 120 (see FIG. 1).

By providing the heat transfer member 6 in such a manner as to closely contact the surface of the coil 5 in this fashion, heat generated by the coil 5 can be efficiently transferred, thereby improving the cooling capacity.

Moreover, by providing the magnetic flux transfer member 53 and the heat transfer member 6, the magnetic flux is transferred via the magnetic flux transfer member 6 having a high magnetic permeability, and heat generated by the coil 5 is transferred via the heat transfer member 6, so that it becomes possible to select materials which are proper for the characteristics required for the respective members.

Further, by causing the magnetic flux transfer member 6 to protrude from the surface of the heat transfer member 6, and by shortening a distance $\delta 1$ from the magnetic flux transfer member 53 to the magnet 121 of the rotor 120 (see FIG. 1) in comparison with a distance 62 from the heat transfer member 6 to the magnet 121 of the rotor 120 (see FIG. 9), the magnetic flux is transferred to the magnet 121 of the rotor 120 via the magnetic flux transfer member 53, not via the heat transfer member 6.

Accordingly, it is possible to reduce the magnetic flux passing through the heat transfer member 6, and it is possible to suppress generation of an eddy current even if a conductive material (e.g., copper, aluminum, and an alloy thereof) having a good thermal conductivity is used for the heat transfer member 6.

Because magnetic fluxes (F1, F2) transferred to the magnet 121 of the rotor 120 via the magnetic flux transfer member 53 change in accordance with a change in an alternating current to be supplied or displacement of poles (N pole, S pole), as shown in FIG. 8A, induced currents i1, i2 tend to flow through the heat transfer member 6 in a direction in which any changes in the magnetic fluxes (F1, F2) are impeded.

As the induced currents i1, i2 flow through, the heat transfer member 6 generates a loss then heated, resulting in any reduction of the torque characteristic, so that the slits 61 are so formed as to cut off the flow of the induced currents i1, i2 flowing through the heat transfer member 6.

That is, in FIG. 8A, the slit 61 is so formed as to extend from the outer peripheral edge to the inner peripheral edge along the direction of the magnetic flux transfer member 53 so as to (at such a position as to) cut off the induced currents i1, i2 flowing through the outer peripheral edge side of the heat transfer member 6. The magnetic flux transfer member 53 is housed in each slit 61, and respective magnetic flux transfer members are spaced apart from one another.

Note that within a pole (N, S) inwardly of the induced currents i1, i2, induced currents i1', i2' tend to flow in a direction in which such currents are cancelled with each other, so that no induced current is generated, but because the positions of the induced currents i1, i2 move along with the displacement of the pole (N, S), the slits 61 are formed in such a way that the individual magnetic flux transfer members are spaced apart.

An induced current cutoff slit is not limited to the form of the slit 61, and can employ various forms, and the shape is related to the cooling device 2, but an induced current cutoff slits may be so formed as to have successive inner peripheral edges in a circumferential direction and extend from the inner peripheral edges to the outer peripheral edges so as to cut off the induced current i1, i2 flowing through the inner peripheral edge side of the heat transfer member 6.

As shown in FIG. 8B, slits 61' which serve as induced current cutoff slits may be alternately formed in such a way that one extends from the outer periphery to the inner peripheral edge, and another extends from the inner periphery to the outer peripheral edge, so that a heat transfer member 6' may be formed successively in a zigzag shape.

In short, an induced current cutoff slit should be formed to cut off the induced currents i1, i2 flowing through the heat transfer member 6, 6' while the pole (N, S) is moving.

Note that in the embodiment, by forming the magnetic flux transfer member 53 to protrude from the surface of the heat transfer member 6, the magnetic flux generated by the coil 5 is forced to pass through the magnetic flux transfer member 53, not through the heat transfer member 6, and to be transferred to the magnet 121 disposed in the rotor 120. However the present invention is not limited to this, and it is possible to force the magnetic flux to be transferred through the magnetic flux transfer member 53 by setting the magnetic permeability of the heat transfer member 6 to be lower than that of the magnetic flux transfer member 53.

In short, a structure that allows the magnetic flux to be transferred to the magnet 121 of the rotor 120 through the magnetic flux transfer member 53, not through the heat transfer member 6 should be employed, and such a structure can be realized on the basis of a relationship between a distance from the magnetic flux transfer member 53 to the magnet 121 of the rotor 120 (see FIG. 1) and a distance from the heat transfer member 6 to the magnet 121, and a relationship between the magnetic permeability of the magnetic flux transfer member 53 and that of the heat transfer member 6.

Moreover, for the magnetic flux transfer member 53, an iron-based metal or the like widely used as a core material can be used, but it is desirable to use a grain-oriented magnetic steel sheet which has a high conversion efficiency of electrical energy and magnetic energy, and is facilitated to be magnetized only in one direction to improve the magnetic flux transfer efficiency.

The heat transfer member 6 serves to absorb heat generated by the coil 5 and transfers the heat to the cooling portion (the inner peripheral edge of the stator 1) of the cooling device 2.

Figure 3E:
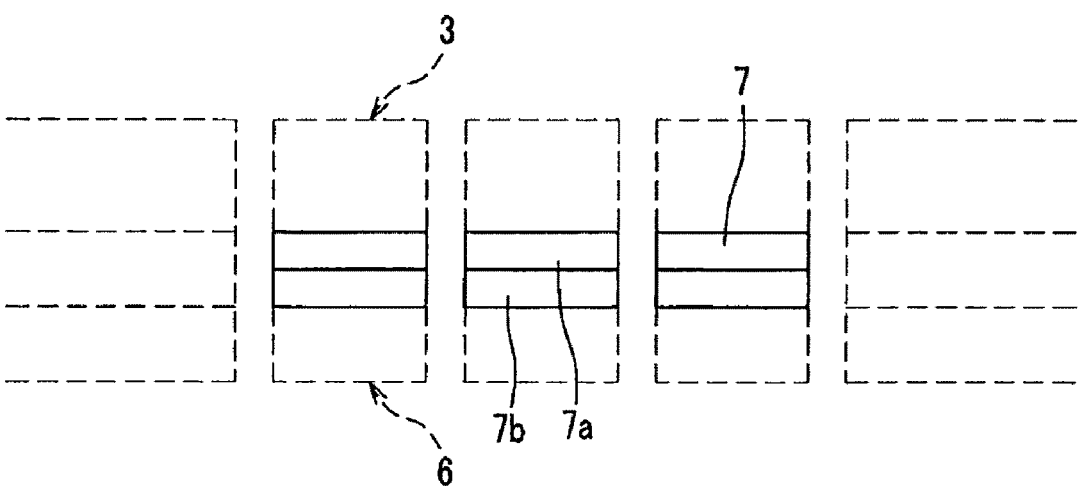
FIG. 3E is a partial plan view of an example of an insulator sandwiched between the heat transfer member and the first coil plate shown in FIG. 3A.

Therefore, it is desirable that the heat transfer member 6 should closely contacts the surface of the coil 5 via a insulator. In this structure, heat transferred by the heat transfer member 6 can be efficiently transferred in the direction of the flow of the coolant which flows in the water jacket 22. Moreover, as the coil 5 and the heat transfer member 6 are electrically insulated, it is possible to cause the heat transfer member 6 to closely contact the surface of the coil 5, and it becomes possible to select materials which are appropriate to the respective characteristics required for the coil and the heat transfer member regardless of the presence/absence of the conductive property of the heat transfer member 6. The insulator can comprise, as shown in FIG. 3E, an insulation sheet only, but the insulator 7 may comprise plural layers of an insulation sheet 7a (electrical insulator but thermally conductive) and a graphite sheet 7b, and by arranging the insulation sheet 7a on the coil side, the insulator 7 can have a characteristic which is likely to transfer heat in a specific direction, and transfers heat generated by the coil 5 in the direction of the water jacket 22 together with the heat transfer member 6.

The cooling device 2 is connected to a non-illustrated coolant supplying device, and as shown in FIG. 1, it is structured that the inner edge portion of the stator 1 is cooled down by a coolant flowing in the water jacket 22. That is, as shown in FIG. 2, the coolant enters from a coolant inlet 21a formed in the shaft 110, flows through the coolant passage 21 in the rim 111 outwardly of the radial direction (arrow f1), flows to the water jacket 22, is separated right and left and flows to the opposite side of the circumferential direction (arrow f2), and flows in the rim 111 again from the external side of the radial direction to the internal side (arrow f3), and flows out from a coolant outlet 21b, thereby circulating in the water jacket 22. The inner edge side portion of the stator 1 is cooled in this fashion, and heat generated by the coil 5 is transferred to the inner edge side portion of the stator 1 by the heat transfer member 6.

Next, an explanation will be given of the working and effect of the stator structured as explained above according to the embodiment of the present invention and used for the motor 100 with reference to mainly FIGS. 9 to 13.

Figure 9:
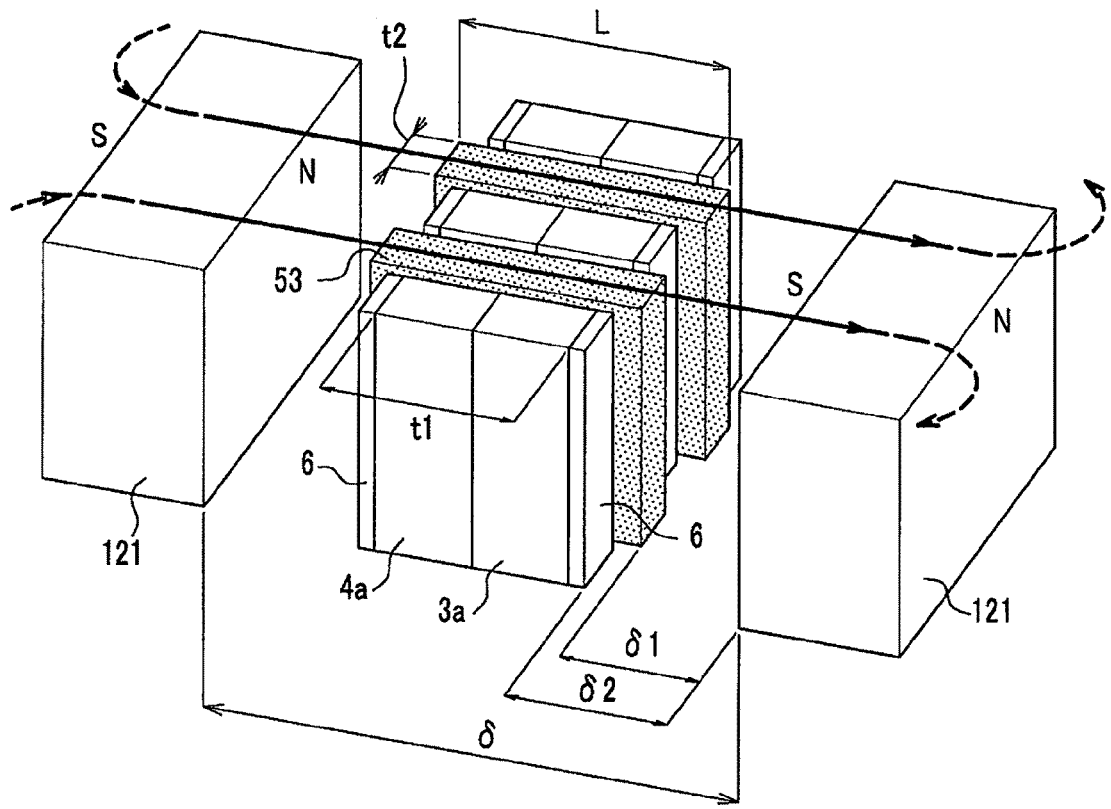
FIG. 9 is a partial perspective view of the stator and a rotor for showing a magnetic flux transferred through the magnetic flux transfer member.
Figure 10:
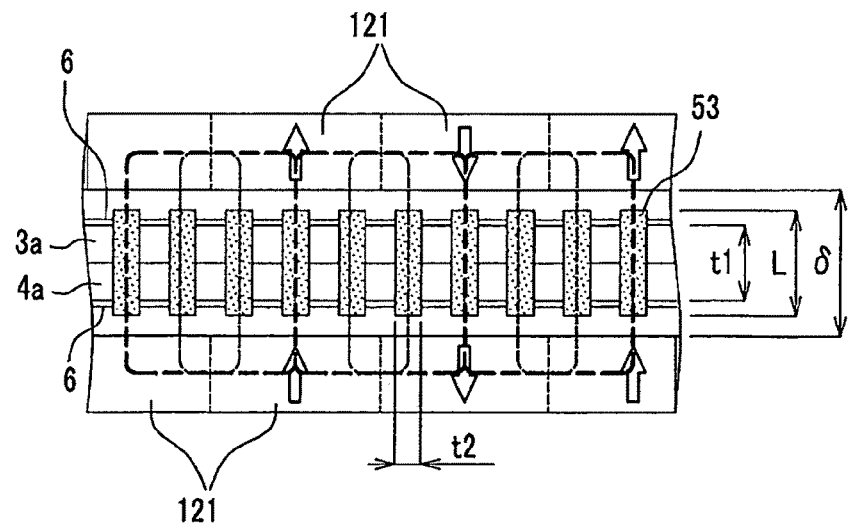
FIG. 10 is a partial cross-sectional plan view of the coil assembly for explaining the relationship between the magnetic flux transfer member and the magnetic air gap.
Figure 11:
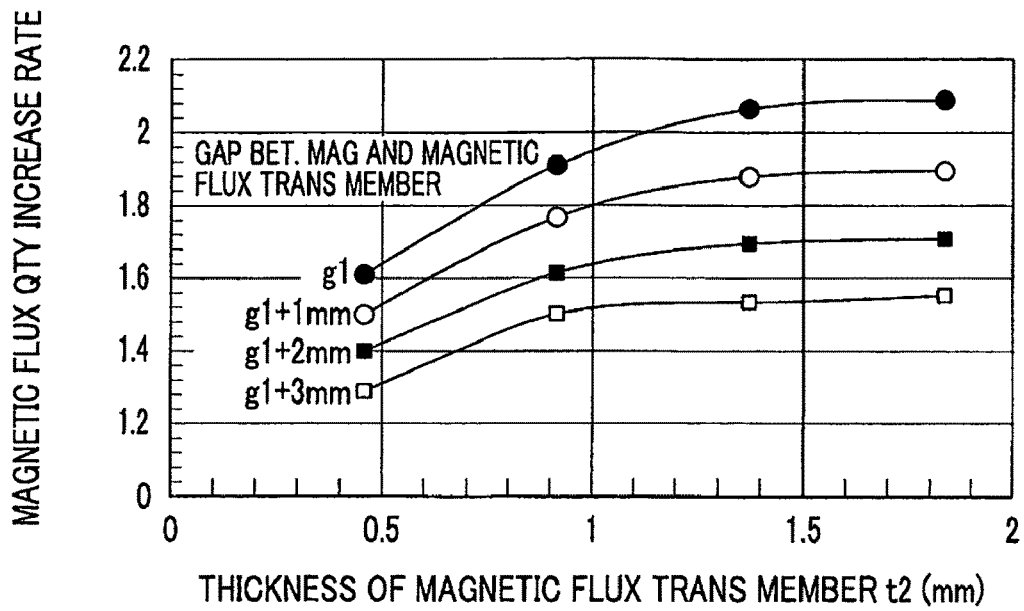
FIG. 11 is a chart showing an increment rate of an effective flux quantity by the magnetic flux transfer member.
Figure 12:
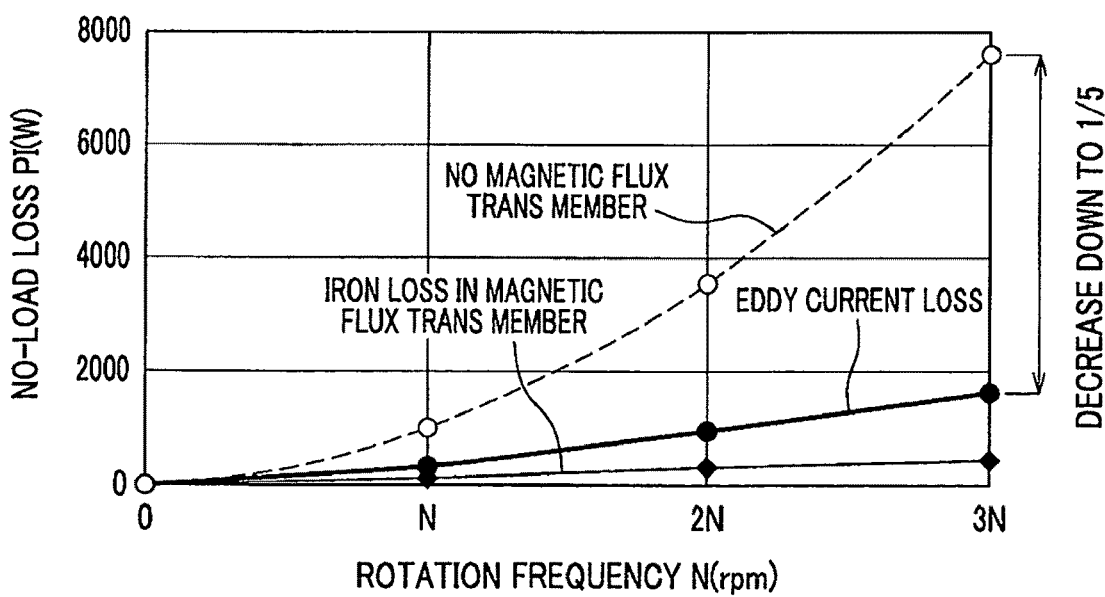
FIG. 12 is a chart showing the reduction effect of no-load loss by the magnetic flux transfer member.
Figure 13:
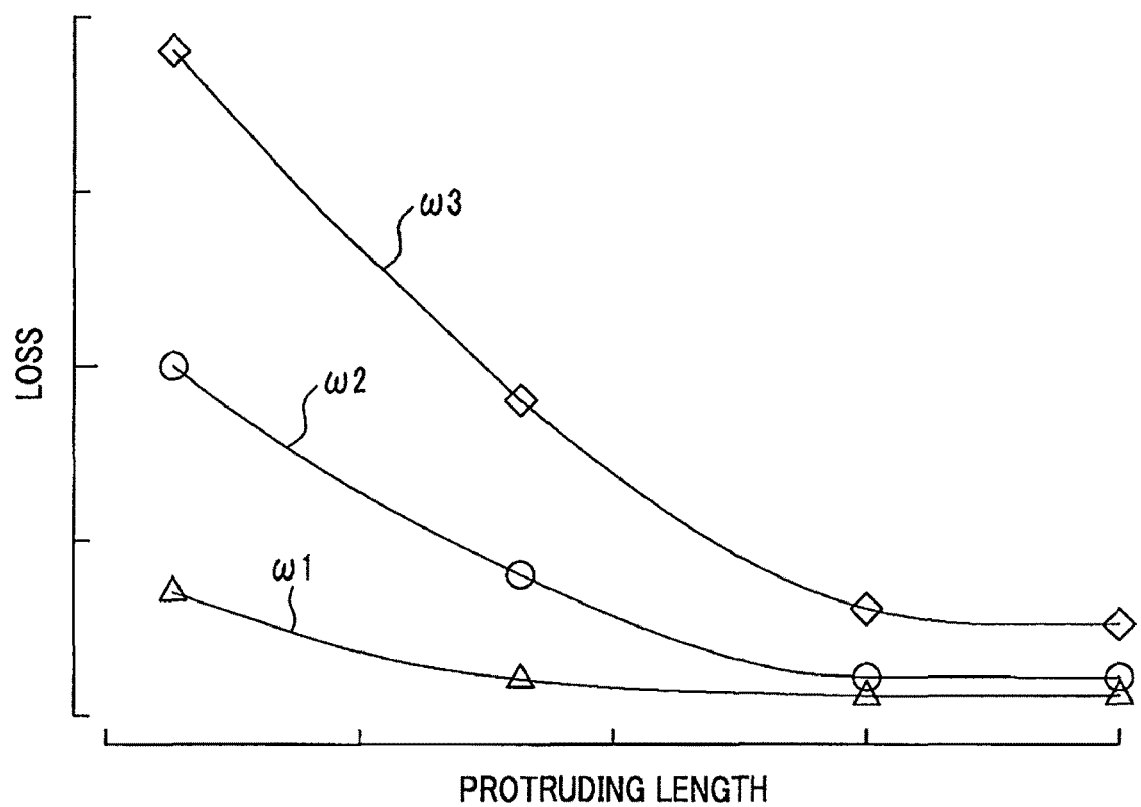
FIG. 13 is a chart showing a reduction rate of an eddy current loss by a protruding length of the magnetic flux transfer member.

In the accompanying drawings, FIG. 9 is a perspective view showing how a magnetic flux is transferred through the magnetic flux transfer member, and FIG. 10 is a partial cross-sectional plan view for explaining the relationship between the magnetic flux transfer member and the magnetic air gap. FIG. 11 is a chart showing an increment rate of an effective flux quantity by the magnetic flux transfer member, and FIG. 12 is a chart showing the reduction effect of no-load loss by the magnetic flux transfer member. FIG. 13 is a chart showing the relationship between the protruding length of the magnetic flux transfer member and an eddy-current loss.

In the motor 100 of the embodiment of the present invention, as an alternating current is supplied to the feeding terminals A1, the three phases of the U-phase, V-phase and W-phase coil loops CU, CV, and CW flow.

At the central straight line portions $3a_3$, $4a_3$ of coil segments 3a, 4a of respective phases, currents I flow in the same direction (outer circumferential direction or inner circumferential direction), the directions of the magnetic fluxes by the currents I become consistent, and magnetic fields are generated so as to be added to each other.

Because the magnetic-flux-transfer-member slots 32, 42 are formed at the central straight line slits of the coil segments 3a, 4a (conductors) and the magnetic flux transfer members 53 are inserted therein so as to protrude from the surface of the heat transfer member 6, as shown in FIG. 9, the magnetic flux passes through the magnetic flux transfer member 53, a magnetic flux loop is formed, and is transferred to the magnets 121 of the rotors 120.

More specifically, as the magnets 121, 121 are so disposed as to face the magnetic flux transfer member 53 so that opposite poles (N pole and S pole) face with each other through the coils CU1, CU2, and CU3, the magnets 121, 121 are magnetized in the thickness direction, so that the magnetic flux passes through from the magnet 121 shown in the left side in the figure to the right side magnet 121, thereby forming a magnetic flux loop across a non-illustrated adjoining magnet.

In FIG. 9, δ represents a distance between the magnets 121. δ1 represents a gap (δ−L)/2 between the magnetic flux transfer member 53 and the magnet 121. Moreover, (δ2−δ1) represents a protruding length that the magnetic flux transfer member 53 protrudes from the surface of the heat transfer member 6. As shown in FIG. 13, by increasing the protruding length, the magnetic flux passing through the coil 5 and the heat transfer member 6 is reduced, so that any generation of an eddy current in the coil 5 and the heat transfer member 6 is suppressed, thereby reducing a loss. Further, FIG. 13 indicates difference in loss with respect frequencies $\omega 1$, $\omega 2$, and $\omega 3$, and frequency becomes high in the order from $\omega 1$ to $\omega 3$.

Therefore, as the magnetic flux transfer member 53 is inserted, the magnetic flux is transferred via the magnetic flux transfer member 53, so that as shown in FIG. 10, the substantive magnetic air gap is defined by $(\delta-L)$, regardless of the thicknesses t1 of the coil segments 3a, 4a (conductors).

Accordingly, even though the magnetic air gap becomes large by increasing the thicknesses t1 of the coil segments 3a, 4a, if the length L of the magnetic flux transfer member 53 is set to be longer than the increment of the thicknesses of the coil segments, the substantive magnetic air gap $(\delta-L)$ can be reduced, so that the effective flux quantity can be increased, thereby improving the torque characteristic. Therefore, the stator 1 can be applied to a motor having a high output of greater than or equal to several 10 k Watts.

Moreover, by inserting the magnetic flux transfer member 53 in the slits formed in the coil segments 3a, 4a (conductors) and joining those together by resin molding or the like, the rigidity of the coil can be improved.

Further, because the magnetic flux is transferred to the magnet 121 of the rotors 120 via the magnetic flux transfer member 53, it is possible to extremely reduce an eddy-current loss generated in the coil segments 3a, 4a (conductors).

Accordingly, as shown in FIG. 12, by inserting the magnetic flux transfer member 53 into the magnetic-flux-transfer-member slots 32, 42, a no-load loss which is the total of a magnetic-flux-transfer-member iron loss originating from magnetization of the magnetic flux transfer member 53 and a coil eddy-current loss can be reduced down to ⅓ in comparison with a case where the magnetic flux transfer member 53 is not present.

As shown in FIG. 11, the rate that the effective flux quantity increases (flux quantity increase ratio) can be defined on the basis of the relationship between the thickness (t2) of the magnetic flux transfer member 53 and the gap 61 between the magnetic flux transfer member 53 and the magnet 121.

More specifically, the flux quantity increase ratio gradually increases when the thickness t2 of the magnetic flux transfer member 53 increases, and decreases when the gap $\delta 1$ increases.

Further, by widening only the magnetic-flux-transfer-member slots 32, 42 without widening the widths of the slits 31, 41 across the entire length, it is possible to suppress any reduction of the conductor fill factor. Moreover, by inserting and accommodating the magnetic flux transfer member 53 into the magnetic-flux-transfer-member slots 32, 42 which are wider than the slits 31, 41, it is possible to design the shapes of the magnetic-flux-transfer-member slots 32, 42 to fit the shape of the magnetic flux transfer member 53, so that magnetic flux transfer member 53 can be stably held.

Although the embodiment of the present invention has been explained above, the present invention is not limited to the foregoing embodiment, and can be changed and modified in various forms.

For example, the present invention is applied to the stator 1 of the motor 100, but the present invention is not limited to this application, and the stator of an electric generator can be structured in the same fashion.

In the foregoing embodiment, the heat transfer member 6 can be formed of copper or aluminum, but the present invention is not limited to this case, and a member formed of graphite may be used which is easy to transfer heat in a surface direction in particular because graphite has laminated-layer crystal construction of carbon. With this structure, absorbed heat can be rapidly transferred in a predetermined transfer direction.

As mentioned above, there is provided a coil assembly 8 for a stator 1 of an electrical rotating machine 100 including: first and second coil plates 3 and 4 each including coil segments 3a and 4a, one coil segment adjoining another coil segment through a slit 31 comprising a slot 32, the first and second coil plates 3 and 4 being laminated so that the slots 32 thereof overlap with each other, the first and second coil plates 3 and 4 being mechanically and electrically connected so as to have coils CU1, CU2, and CU3; and magnetic transfer members 53 in the slots 32 configured to transfer magnetic flux therethrough.

Further, in the coil assembly the slot 32 has a width greater than a width of a part of the slit 31 other than the slot 32.

At least one of the first and second coil plates 3 and 4 comprises a plurality of coil plate base members 3b and 4b which are laminated, each of the coil plate base members 3 and 4 are formed by etching.

Further, the first and second coil plates 3 and 4 are mechanically and electrically connected through a diffusion bonding portion $3a_1$ or $4a_1$.

Further, the magnetic transfer members 53 in the slots 32 protrude from the coil segments 3a and 4a as shown in FIG. 9.

Further there is provided an electrical rotating machine 100 comprising the stator 1, further comprising: two rotors 120 each including a plurality of pairs of magnets 121, each pair of magnets 121 facing each other with opposite magnetic polarity through the coils CU1, CU2, and CU3. The heat transfer member 6 includes induced-current-cutoff slits 61 or 61', and the magnetic transfer members 53 protrude from the heat transfer member 6 through the induced-current-cutoff slits 61 or 61', wherein the induced-current-cutoff slits 61 or 61' are disposed at such positions as to cut off induced currents generated in the heat transfer member 6.

Further, the heat transfer member 6 includes a lower magnetic permeability than the magnetic flux transfer member 53. The stator 1 further includes a coolant passage 21a and 21b that allows a coolant to flow therethrough and is thermally coupled to the heat transfer member 6 to conduct heat generated by the coils CU1, CU2 and CU3 to the coolant.

Further, in the stator 1 the heat transfer member 6 closely contacts the surface of the coils CU1, CU2, and CU3 via an insulator 7. The insulator 7 comprises an insulation sheet 7a and a heat transfer sheet 7b which more transfers heat in one direction than other directions, and is so disposed as to transfer heat generated by the coil in the direction of the coolant passage.

Further, in the stator, the heat transfer member 6 includes an electrical conductive material.

Further there is provided an electrical rotating machine including the coil assembly, further comprising: two rotors each including a plurality of pairs of magnets, each pair of magnets facing each other with opposite magnetic polarity through the coil.

Further there is provided an electrical rotating machine 100 further including: two rotors 120 each including a plurality of pairs of magnets 121, each pair of magnets 121 facing each other with opposite magnetic polarity through the coil.

We claim:

1. A coil assembly for a stator of an electrical rotating machine comprising:
   first and second coil plates each including coil segments, one coil segment adjoining another coil segment through a slit comprising a slot, the first and second coil plates being laminated so that the slots thereof overlap with each other, the first and second coil plates being mechanically and electrically connected so as to have a coil;
   magnetic transfer members configured to transfer magnetic flux and to extend through both slots of the first and second coil plates; and
   a heat transfer member covering at least one of the first and second coil plates, wherein the heat transfer member includes a lower magnetic permeability than the magnetic flux transfer member.

2. A coil assembly for a stator of an electrical rotating machine comprising:
   first and second coil plates each including coil segments, one coil segment adjoining another coil segment through a slit comprising a slot, the first and second coil plates being laminated so that the slots thereof overlap with each other, the first and second coil plates being mechanically and electrically connected so as to have a coil;
   magnetic transfer member configured to transfer magnetic flux and to extend through both slots of the first and second coil plates;
   a heat transfer member covering at least one of the first and second coil plates; and
   a coolant passage that allows a coolant to flow therethrough and is thermally coupled to the heat transfer member to conduct heat generated by the coil to the coolant.

3. A stator, comprising:
   a coil assembly comprising
      first and second coil plates each including coil segments, one coil segment adjoining another coil segment through a slit comprising a slot, the first and second coil plates being laminated so that the slots thereof overlap with each other, the first and second coil plates being mechanically and electrically connected so as to have a coil, and
      magnetic transfer members in the slots configured to transfer magnetic flux,
   the stator further comprising a heat transfer member covering at least one of the first and second coil plates,
   wherein the heat transfer member includes induced-current-cutoff slits, and the magnetic transfer members protrude from the heat transfer member through the induced-current-cutoff slits.

4. The stator as claimed in claim 3, wherein the induced-current-cutoff slits are disposed at such positions as to cut off induced currents generated in the heat transfer member.

5. The stator as claimed in claim 3, wherein the heat transfer member includes a lower magnetic permeability than the magnetic flux transfer member.

6. The stator as claimed in claim 3, further comprising a coolant passage that allows a coolant to flow therethrough and is thermally coupled to the heat transfer member to conduct heat generated by the coil to the coolant.

7. The stator as claimed in claim 3, wherein the heat transfer member closely contacts the surface of the coil via an insulator, and wherein the insulator comprises an insulation sheet and a heat transfer sheet which more transfers heat in one direction than other directions, and is so disposed as to transfer heat generated by the coil in the direction of the coolant passage.

8. An electrical rotating machine comprising the stator as claimed in claim 3, wherein the electrical rotating machine comprises two rotors each including a plurality of pairs of magnets, each pair of magnets facing each other with opposite magnetic polarity through the coil.

9. The stator as claimed in claim 3, wherein the slot has a width greater than a width of the slit.

* * * * *